US009367572B2

(12) United States Patent
Boic (10) Patent No.: US 9,367,572 B2
(45) Date of Patent: Jun. 14, 2016

(54) METADATA-BASED FILE-IDENTIFICATION SYSTEMS AND METHODS (71) Applicant: RealNetworks, Inc., Seattle, WA (US)

(72) Inventor: Milko Boic, Sammamish, WA (US)

(73) Assignee: REALNETWORKS, INC., Seattle, WA (US)

( * ) Notice: Subject to any disclaimer, the term of this patent is extended or adjusted under 35 U.S.C. 154(b) by 0 days.

(21) Appl. No.: 14/480,487

(22) Filed: Sep. 8, 2014

(65) Prior Publication Data

US 2015/0074152 A1 Mar. 12, 2015

Related U.S. Application Data (60) Provisional application No. 61/874,929, filed on Sep. 6, 2013.

(51) Int. Cl.
G06F 17/30 (2006.01)
H04L 29/08 (2006.01)
H04L 29/06 (2006.01)

(52) U.S. Cl.
CPC ........ *G06F 17/30292* (2013.01); *G06F 17/301* (2013.01); *G06F 17/3005* (2013.01); *G06F 17/30038* (2013.01); *G06F 17/3084* (2013.01); *G06F 17/30091* (2013.01); *G06F 17/30749* (2013.01); *G06F 17/30769* (2013.01); *G06F 17/30817* (2013.01); *H04L 65/602* (2013.01); *H04L 67/2804* (2013.01)

(58) Field of Classification Search
CPC ................... G06F 17/30292; G06F 17/30091; G06F 17/30749; G06F 17/30817; G06F 17/3005; G06F 17/3084; G06F 17/30769; G06F 17/30038; G06F 17/301; H04L 67/2804; H04L 65/602
See application file for complete search history.

(56) References Cited

U.S. PATENT DOCUMENTS

| 8,457,770 | B1* | 6/2013 | Martin | H04L 67/303 700/94 |
| 2004/0019901 | A1* | 1/2004 | Spio | H04N 7/165 725/25 |
| 2006/0282465 | A1* | 12/2006 | Sharma | G06F 17/30864 |
| 2007/0101147 | A1* | 5/2007 | Brunk | G06K 9/00744 713/176 |
| 2007/0276823 | A1* | 11/2007 | Borden | G06F 17/30097 |
| 2008/0189390 | A1 | 8/2008 | Heller et al. | |
| 2008/0288411 | A1* | 11/2008 | Copley | G06F 21/10 705/52 |
| 2010/0063931 | A1 | 3/2010 | Cole et al. | |
| 2010/0121744 | A1 | 5/2010 | Belz et al. | |
| 2010/0205222 | A1* | 8/2010 | Gajdos | G06F 17/30766 707/803 |
| 2011/0055191 | A1* | 3/2011 | Bain | G06F 17/30864 707/706 |
| 2013/0132350 | A1 | 5/2013 | Mooneyham | |
| 2014/0181158 | A1* | 6/2014 | Herz | G06F 17/30038 707/821 |

* cited by examiner

Primary Examiner — Daniel Kinsaul
(74) Attorney, Agent, or Firm — AEON Law; Adam L. K. Philipp (57) ABSTRACT In a system comprising media files resident on various devices, devices equipped with media servers can deliver files to devices with media clients for purposes of playback (rendering) and/or storage. Some media servers may be capable of delivering files in various formats and may offer clients delivery format options. Media clients are aware of preferential list of formats that can be supported on a device and can choose from delivery options provided by media servers. Media files are introduced on the devices either via means external to this system or by leveraging system's media servers and media clients to transfer content between devices. When media files are introduced on the devices by means external to this system, media scanners detect such media files and make it available to media servers and thus to the rest of the system.

21 Claims, 6 Drawing Sheets

METADATA-BASED FILE-IDENTIFICATION SYSTEMS AND METHODS

CROSS-REFERENCE TO RELATED APPLICATIONS

This application claims the benefit of priority to Provisional Patent Application No. 61/874,929; filed Sep. 6, 2013; titled MULTI-DEVICE MEDIA CONTENT IDENTIFICATION AND SOURCING SYSTEMS AND METHODS; and naming inventor Milko BOIC. The above-cited application is hereby incorporated by reference, in its entirety, for all purposes.

FIELD

This disclosure is directed to the field of software, and more particularly to identifying and serving audio and/or video media files in a distributed-media-library system.

BACKGROUND

Various media systems allow different devices to share locally-hosted media files with other devices connected via a network. In some cases, two or more devices may each have copies of a given piece of media content, copies that may differ from one another in terms of media format, resolution, bitrate, or the like. However, existing systems may fail to identify multiple copies of the same piece of media content within the system and provide methods for automatically selecting which copy to use for playback in a given context.

DESCRIPTION

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

In a distributed-media-library system, a piece of content can enter a user's repository via various devices. When a piece of content is introduced to the system, the content file is given a unique identifier that is derived from metadata associated with the content file (e.g., based on the file name and a file size), as opposed to being based on the media content itself. All devices in the distributed-media-library system use the same process for generating a unique identifier, so a given piece of content will always get the same identifier, no matter where it first enters the distributed-media-library system.

For example, two video files recorded on two different mobile devices could easily have the same file name (e.g., "movie001.mp4"). However, it is unlikely that two video files recorded on two different devices will have the same file size, and it is extremely unlikely that two video files that have the same file name will also have the same file size. Therefore, an identifier that is sufficiently likely to be unique can be derived by combining the file name and file size of a given video file.

For media types whose file sizes may vary less than those of video files, an additional metadata element may be introduced. For example, for an lossy-compressed audio file, a sufficiently unique identifier could be derived from three metadata elements: file name, file size, and content duration. Similarly, for a lossy-compressed still image, a sufficiently unique identifier could be derived from three metadata elements: file name, file size, and creation date or similar timestamp metadata.

In many distributed-media-library systems, a given piece of content may be transcoded when that content is transferred to from one device to another. The transcoded derivative version of a given piece of content would very likely have a different set of metadata elements than the original file. However, most, if not all, media and/or container formats provide support for embedding arbitrary metadata (e.g., the unique identifier) into a given audio and/or video media file. Using such arbitrary-metadata support, when derivative versions of a given piece of content are made from an original, the unique identifier of the original file is embedded into the derivative version so that the derivative version can be identified as corresponding to the original when the derivative version is subsequently encountered and/or processed by the distributed-media-library system. Consequently, when the distributed-media-library system presents a list of available content to a user, each piece of content can be listed only once, regardless of how many derivative versions may exist on various devices in the distributed-media-library system.

More specifically, as discussed herein, in various embodiments, a processor and/or processing device may be configured (e.g., via non-transitory computer-readable storage media) to perform a first method for introducing audio and/or video media files into a distributed-media-library system, the first method including steps similar to some or all of the following:

obtaining an audio and/or video media file of a given media type for import into the distributed-media-library system;

determining that the audio and/or video media file has not previously been processed by any device of the distributed-media-library system;

obtaining a predetermined set of media-type-specific, fingerprint instructions for generating unique identifiers based on metadata associated with audio and/or video media files of various media types;

selecting a fingerprint instruction from the set of media-type-specific fingerprint instructions based at least in part on the given media type;

determining a first set of at least two metadata elements associated with the audio and/or video media file;

combining the first set of at least two metadata elements according to the selected fingerprint instruction to generate a deterministic, system-wide, metadata-derived unique identifier;

embedding the metadata-derived unique identifier in the audio and/or video media file;

determining that no version of the audio and/or video media file already exists in the distributed-media-library system;

recording the metadata-derived unique identifier in a distributed media-metadata database;

generating a derivative version of the audio and/or video media file, the derivative version being associated with a second set of at least two metadata elements, the second set of at least two metadata elements differing from the first set of at least two metadata elements; and/or embedding the metadata-derived unique identifier in the derivative version to associate the derivative version with the audio and/or video media file when the derivative version is subsequently encountered in the distributed-media-library system.

In some cases, determining that the audio and/or video media file has not previously been processed by any device of the distributed-media-library system may include attempting, but failing to locate an embedded deterministic, system-wide, metadata-derived unique identifier within the audio and/or video media file, or the like.

In some cases, determining that no version of the audio and/or video media file already exists in the distributed-media-library system may include querying the distributed media-metadata database to determine that the metadata-derived unique identifier has not been previously recorded in the distributed media-metadata database, or the like.

In some cases, when the audio and/or video media file is of a video media type, the first set of at least two metadata elements consists of a file-name metadata element and a file-size metadata element.

In some cases, when the audio and/or video media file is of an image media type, the first set of at least two metadata elements consists of a file-name metadata element, a file-size metadata element, and a creation or modification timestamp metadata element.

In some cases, when the audio and/or video media file is of an audio media type, the first set of at least two metadata elements consists of a file-name metadata element, a file-size metadata element, and a duration metadata element.

Described more fully below are many additional details, variations, and embodiments that may or may not include some or all of the steps, features, and/or functionality described above.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
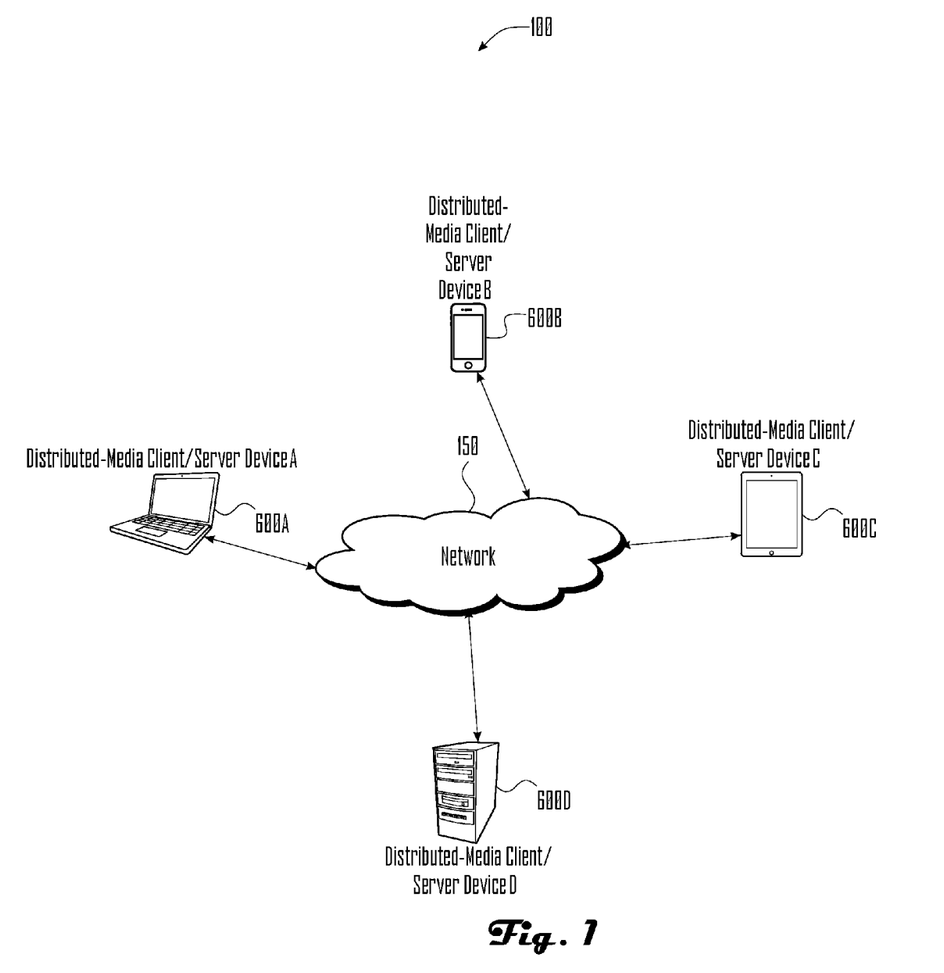
FIG. 1 illustrates a simplified multi-device distributed media library organization system in which distributed-media client/server device, distributed-media client/server device, distributed-media client/server device, and distributed-media client/server device are connected to network.

FIG. 1 illustrates a simplified multi-device distributed media library organization system in which distributed-media client/server device 600A, distributed-media client/server device 600B, distributed-media client/server device 600C, and distributed-media client/server device 600D are connected to network 150.

In various embodiments, network 150 may include the Internet, a local area network ("LAN"), a wide area network ("WAN"), and/or other data network.

In various embodiments, additional infrastructure (e.g., cell sites, routers, gateways, firewalls, and the like), as well as additional devices may be present. However, it is not necessary to show such infrastructure and implementation details in FIG. 1 in order to describe an illustrative embodiment.

In an exemplary scenario, media files may be resident on various interconnected devices that share media library content. At least some of the devices may include media scanners, media clients, and/or media servers. The devices themselves can interconnect via media servers and media clients resident thereon.

Figure 2:
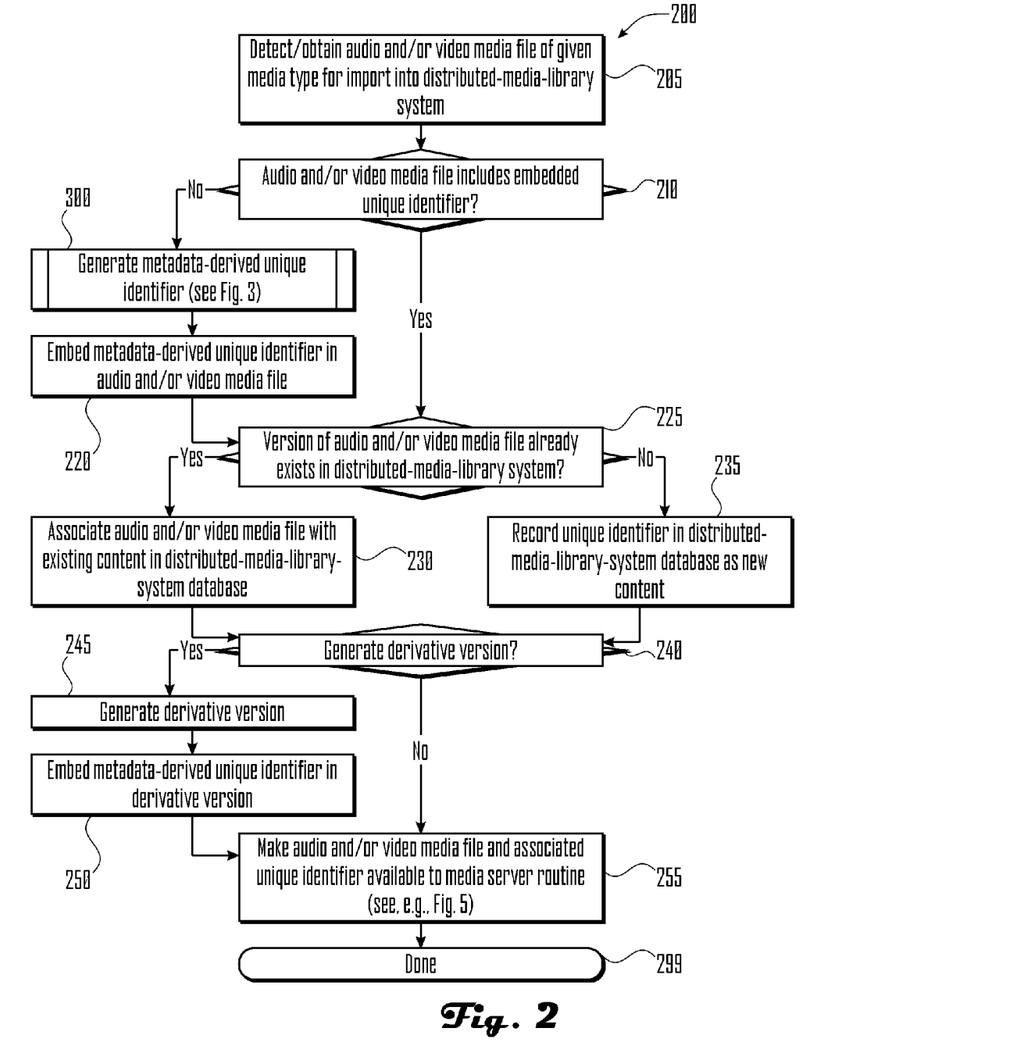
FIG. 2 illustrates a media-introduction routine for introducing audio and/or video media files into a distributed-media-library system, such as may be performed by a distributed-media client/server device in accordance with one embodiment.

FIG. 2 illustrates a media-introduction routine 200 for introducing audio and/or video media files into a distributed-media-library system, such as may be performed by a distributed-media client/server device 600 in accordance with one embodiment.

In block 205, media-introduction routine 200 detects and/or obtains an audio and/or video media file of a given media type for import into the distributed-media-library system.

In decision block 210, media-introduction routine 200 determines whether the audio and/or video media file includes an embedded unique identifier. The presence of an embedded deterministic, system-wide, metadata-derived unique identifier would indicate that the audio and/or video media file has previously been processed by some device of the distributed-media-library system. If so, media-introduction routine 200 proceeds to decision block 225; otherwise, media-introduction routine 200 proceeds to metadata-based ID subroutine 300.

In subroutine block 300, media-introduction routine 200 calls subroutine 300 (see FIG. 3, discussed below) to generate a metadata-derived unique identifier corresponding to the audio and/or video media file obtained in block 205.

In block 220, media-introduction routine 200 uses a metadata-embedding facility provided by the media and/or container format to embed a deterministic, system-wide, metadata-derived unique identifier into the audio and/or video media file.

In decision block 225, media-introduction routine 200 determines whether a version of the audio and/or video media file already exists in the distributed-media-library system. In some embodiments, media-introduction routine 200 may query a distributed media-metadata database (e.g., distributed media-metadata database) to determine whether the metadata-derived unique identifier has been previously recorded. If so, media-introduction routine 200 proceeds to block 230; otherwise, media-introduction routine 200 proceeds to block 235.

In block 230, media-introduction routine 200 updates the distributed media-metadata database to indicate that a new derivative version (namely, the audio and/or video media file obtained in block 205) of the identified media content has been encountered.

In block 235, media-introduction routine 200 creates a record for the metadata-derived unique identifier (representing the media content of the audio and/or video media file) in the distributed media-metadata database.

In decision block 240, media-introduction routine 200 determines whether generate a derivative version of the audio and/or video media file. In some cases when a new piece of content is encountered, the distributed-media-library system may automatically create one or more derivative versions that will be suitable for transfer to the user's other media devices. In other cases, the user may provide a subsequent indication to transcode the audio and/or video media file or otherwise create a derivative version.

If media-introduction routine 200 determines to automatically generate a derivative version or otherwise receives an indication to do so, then at that point, media-introduction routine 200 proceeds to block 245; otherwise, media-introduction routine 200 proceeds to block 255.

In block 245, media-introduction routine 200 generates a derivative version of the audio and/or video media file. Generally, a derivative version is associated with a set of at least two metadata elements that differ from those of the original file. In other words, the derivative version will generally have a different file name, file size, creation/modification date, and/or other similar metadata compared to the original file from which is was generated.

In block 250, media-introduction routine 200 embeds into the derivative version the metadata-derived unique identifier that was derived in subroutine block 300 based on metadata elements associated with the audio and/or video media file obtained in block 205. Embedding the metadata-derived unique identifier in this manner enables the distributed-media-library system to associate the derivative version with the original audio and/or video media file when the derivative version is subsequently encountered in the distributed-media-library system.

In block 255, media-introduction routine 200 makes the audio and/or video media file and its associated unique identifier available to serve to the rest of the system. When the media file is subsequently transferred within the system, it is accompanied by its unique identifier. Thus, while media files may be changed in format by media servers to be adapted to the capabilities of a device, the media file's original identity is preserved, allowing the system to understand on which media servers a media file is resident regardless of its format.

Media-introduction routine 200 ends in ending block 299.

Figure 3:
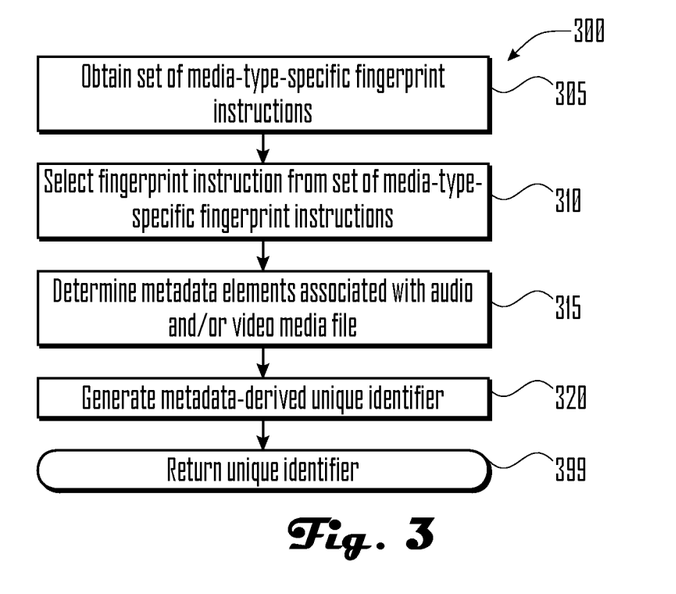
FIG. 3 illustrates a metadata-based ID subroutine for generating a unique identifier for a given audio and/or video media file of a given media type, such as may be performed by a distributed-media client/server device in accordance with one embodiment.

FIG. 3 illustrates a metadata-based ID subroutine 300 for generating a unique identifier for a given audio and/or video media file of a given media type, such as may be performed by a distributed-media client/server device 600 in accordance with one embodiment.

In block 305, metadata-based ID subroutine 300 obtains a predetermined set of media-type-specific, fingerprint instructions for generating unique identifiers based on metadata associated with audio and/or video media files of various media types. In various embodiments, a fingerprint instruction may identify a set of at least two metadata elements and provide instructions for combining those metadata elements into a unique identifier.

In block 310, metadata-based ID subroutine 300 selects a fingerprint instruction from the set of media-type-specific fingerprint instructions based at least in part on the given media type.

In block 315, metadata-based ID subroutine 300 determines the set of at least two metadata elements associated with the given audio and/or video media file according to the selected fingerprint instruction selected in block 310.

For example, in some embodiments, when the given audio and/or video media file is of a video media type, the set of at least two metadata elements may consist of a file-name metadata element and a file-size metadata element. In some embodiments, when the given audio and/or video media file is of an image media type, the set of at least two metadata elements consists of a file-name metadata element, a file-size metadata element, and a creation or modification timestamp metadata element. In some embodiments, when the given audio and/or video media file is of an audio media type, the set of at least two metadata elements consists of a file-name metadata element, a file-size metadata element, and a duration metadata element.

In block 320, metadata-based ID subroutine 300 combines the set of at least two metadata elements according to the selected fingerprint instruction to generate a deterministic, system-wide, metadata-derived unique identifier. For example, in some embodiments, the selected fingerprint instruction may specify that the set of at least two metadata elements are to be concatenated or joined in a particular order to generate a unique identifier such as "movie004.mp4-3294196" (which consists of the file name string joined to an integer byte count of the file with a hyphen character). In other embodiments, different methods of combining the set of at least two metadata elements may be employed.

Metadata-based ID subroutine 300 ends in ending block 399, returning the unique identifier generated in block 320 to the caller.

Figure 4:
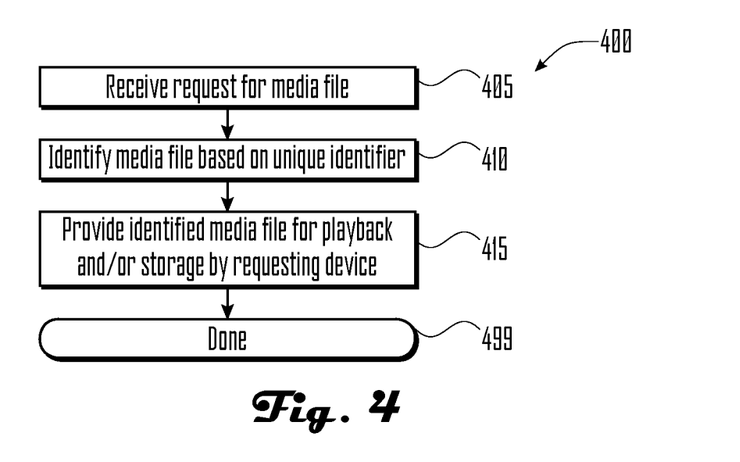
FIG. 4 illustrates a routine for serving media within a shared media system, such as may be performed by a distributed-media client/server device in accordance with one embodiment.

FIG. 4 illustrates a routine 400 for serving media within a shared media system, such as may be performed by a distributed-media client/server device 600 in accordance with one embodiment.

In block 405, routine 400 receives a request, typically from a remote media client, for a media file indicated via a unique identifier.

In block 410, routine 400 identifies the indicated media file using the unique identifier.

In block 415, routine 400 provides the identified media file, with its associated unique identifier, to the requesting device for playback (rendering) and/or storage.

Routine 400 ends in ending block 499.

Figure 5:
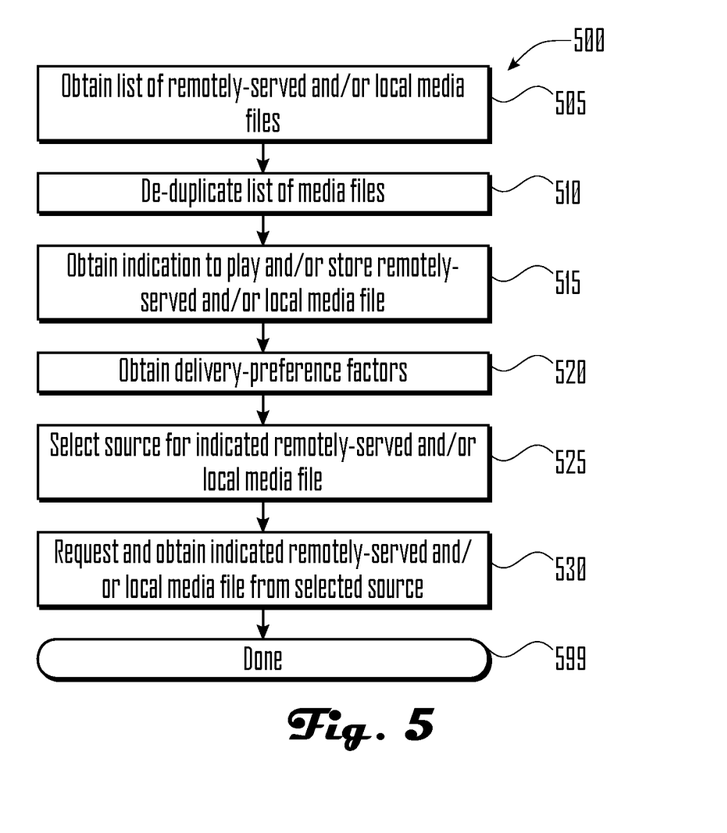
FIG. 5 illustrates a routine for accessing and playing and/or storing media files, such as may be performed by a distributed-media client/server device in accordance with one embodiment.

FIG. 5 illustrates a routine 500 for accessing and playing and/or storing media files, such as may be performed by a distributed-media client/server device 600 in accordance with one embodiment.

In block 505, routine 500 obtains a list of media files, identified according to unique identifiers, that are available locally and/or from media-servers within a distributed-media-library system.

In block 510, using unique identifiers embedded in and/or otherwise associated with the media files, routine 500 identifies one or more derivative versions of the same content, such that a given piece of content is presented only once regardless of how many copies and/or derivative versions exist in the distributed-media-library system.

In block 515, routine 500 obtains an indication, such as from a user, to obtain one of the remotely-served and/or local media files.

In block 520, routine 500 obtains one or more delivery-preference factors according to which an appropriate source for the indicated remotely-served and/or local media file may be selected. For example, in one embodiment, a delivery-preference factor may include a list of one or more preferential formats that can be supported on a device. In other embodiments, a delivery-preference factor may include network connection characteristics between a media server and a media client, device media capability, and the like.

In block 525, routine 500 selects a source for the indicated remotely-served and/or local media file based at least in part on the delivery-preference factors obtained in block 520 and the unique identifier of the indicated remotely-served and/or local media file.

In block 530, routine 500 sends to the source selected in block 525 a request for the indicated remotely-served and/or local media file. Once obtained, the file may be made available for playback (rendering), local storage, or for other like purposes.

Routine 500 ends in ending block 599.

Figure 6:
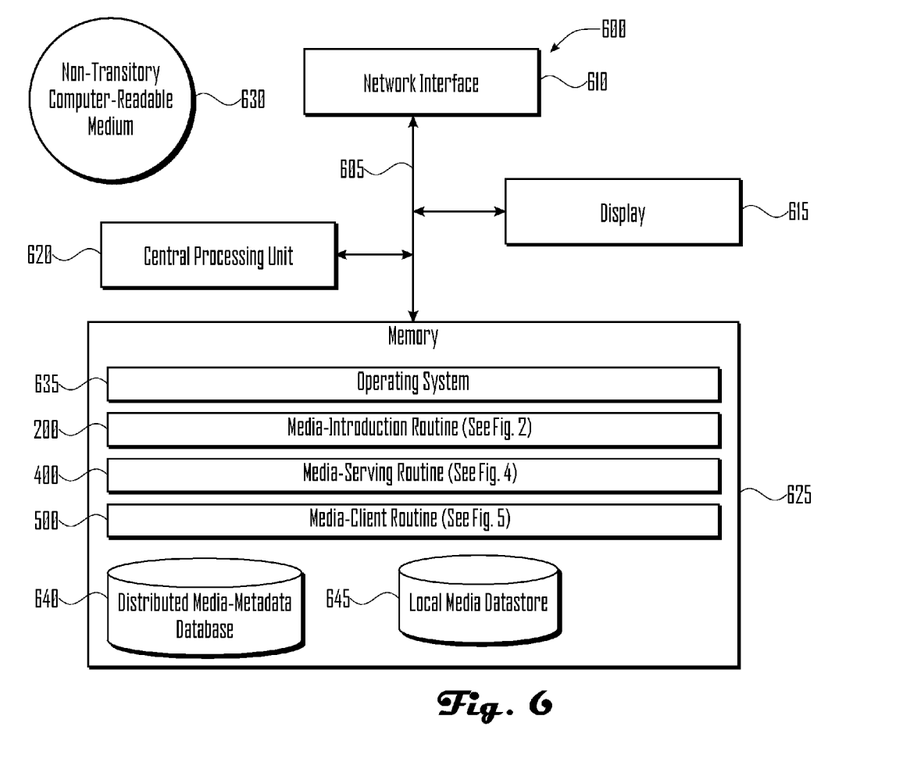
FIG. 6 illustrates several components of an exemplary distributed-media client/server device in accordance with one embodiment.

FIG. 6 illustrates several components of an exemplary distributed-media client/server device in accordance with one embodiment. In various embodiments, distributed-media client/server device 600 may include a desktop PC, server, workstation, mobile phone, laptop, tablet, set-top box, appliance, or other computing device that is capable of performing operations such as those described herein. In some embodiments, distributed-media client/server device 600 may include many more components than those shown in FIG. 6. However, it is not necessary that all of these generally conventional components be shown in order to disclose an illustrative embodiment.

In various embodiments, distributed-media client/server device 600 may comprise one or more physical and/or logical devices that collectively provide the functionalities described herein. In some embodiments, distributed-media client/server device 600 may comprise one or more replicated and/or distributed physical or logical devices.

In some embodiments, distributed-media client/server device 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Distributed-media client/server device 600 includes a bus 605 interconnecting several components including a network interface 610, a display 615, a central processing unit 620, and a memory 625.

Memory 625 generally comprises a random access memory ("RAM") and permanent non-transitory mass storage device, such as a hard disk drive or solid-state drive. Memory 625 stores program code for a media-introduction routine 200 for introducing audio and/or video media files into a distributed-media-library system (see FIG. 2, discussed above); a routine 400 for serving media within a shared media system (see FIG. 4, discussed above); and a routine 500 for accessing and playing and/or storing media files (see FIG. 5, discussed above). In addition, the memory 625 also stores an operating system 635.

These and other software components may be loaded into memory 625 of distributed-media client/server device 600 using a drive mechanism (not shown) associated with a non-transitory computer-readable medium 630, such as a floppy disc, tape, DVD/CD-ROM drive, memory card, or the like.

Memory 625 also includes distributed media-metadata database 640.

Memory 625 also includes local media datastore 645. In some embodiments, distributed-media client/server device 600 may communicate with local media datastore 645 via network interface 610, a storage area network ("SAN"), a high-speed serial bus, and/or via the other suitable communication technology.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A media-library-device-implemented method for introducing media files into a distributed-media-library system, the method comprising:
   obtaining, by a media-library device, a first version of a media file of a given media type for import into the distributed-media-library system, the media file including at least one of audio or video content;
   determining, by the media-library device, that the media file has not previously been processed by any device of the distributed-media-library system;
   obtaining, by the media-library device, a predetermined set of media-type-specific, fingerprint instructions for generating identifiers based on metadata associated with media files of various media types;
   selecting, by the media-library device, a fingerprint instruction from the set of media-type-specific fingerprint instructions based at least in part on the given media type;
   determining, by the media-library device, a first set of two metadata elements being first and second metadata elements associated with the first version of the media file;
   combining, by the media-library device, the first set of two metadata elements associated with the first version of the media file according to the selected fingerprint instruction to generate a deterministic, system-wide, metadata-derived identifier not based on media content of the first version of the media file of the given media type but upon the first metadata element associated with the first version of the media file of the given media type and upon the second metadata element associated with the first version of the media file of the given media type;
   embedding, by the media-library device, the metadata-derived identifier based upon the first metadata element associated with the first version of the media file of the given media type and upon the second metadata element associated with the first version of the media file of the given media type in the first version of the media file;
   recording, by the media-library device, the metadata-derived identifier in a distributed media-metadata database in response to a determination that no other version of the media file already exists in the distributed-media-library system;
   obtaining a second version of the media file of the given media type;
   determining that the second version of the media file has not previously been processed by any device of the distributed-media-library system;
   determining first and second metadata elements associated with the second version of the media file;
   combining the first and second metadata elements associated with the second version of the media file according to the selected fingerprint instruction to generate a deterministic, system-wide, metadata-derived identifier not based on media content of the second version of the media file of the given media type but upon the first metadata element associated with the second version of the media file of the given media type and upon the second metadata element associated with the second version of the media file of the given media type;
   embedding in the second version of the media file the metadata-derived identifier based upon the first metadata element associated with the second version of the media file of the given media type and upon the second metadata element associated with the second version of the media file of the given media type;
   listing the media file of the given media type only once responsive to the metadata-derived identifier based upon the first metadata element associated with the first version of the media file of the given media type and upon the second metadata element associated with the first version of the media file of the given media type in the first version of the media file being identical to the metadata-derived identifier based upon the first metadata element associated with the second version of the media file of the given media type and upon the second metadata element associated with the second version of the media file of the given media type in the second version of the media file, rather than listing both the first and second versions of the given piece of media content, in a content list for presentation to a user.

2. The method of claim 1, wherein determining that the first version of the media file has not previously been processed by any device of the distributed-media-library system comprises attempting, but failing to locate, the deterministic, system-wide, metadata-derived identifier embedded within the first version of the media file.

3. The method of claim 1, wherein determining that no version of the media file already exists in the distributed-media-library system comprises querying the distributed media-metadata database to determine that the metadata-derived identifier has not been previously recorded in the distributed media-metadata database.

4. The method of claim 1, wherein when the media file is of a video media type, the first set of two metadata elements consists of a file-name metadata element and a file-size metadata element.

5. The method of claim 1, wherein when the media file is of an audio media type, the first set of two metadata elements consists of a file-name metadata element and a duration metadata element.

6. A non-transitory computer-readable storage medium having stored thereon instructions including instructions that, when executed by a processor, configure the processor to:
obtain a first version of a media file of a given media type for import into a distributed-media-library system, the media file including at least one of audio or video content;
determine that the first version of the media file has not previously been processed by any device of the distributed-media-library system;
obtain a predetermined set of media-type-specific, fingerprint instructions for generating identifiers based on metadata associated with media files of various media types;
select a fingerprint instruction from the set of media-type-specific fingerprint instructions based at least in part on the given media type;
determine a first set of two metadata elements being first and second metadata elements associated with the first version of the media file;
combine the first set of two metadata elements associated with the first version of the media file according to the selected fingerprint instruction to generate a deterministic, system-wide, metadata-derived identifier not based on media content of the first version of the media file of the given media type but upon the first metadata element associated with the first version of the media file of the given media type and upon the second metadata element associated with the first version of the media file of the given media type;
embed the metadata-derived identifier based upon the first metadata element associated with the first version of the media file of the given media type and upon the second metadata element associated with the first version of the media file of the given media type in the first version of the media file;
record the metadata-derived identifier in a distributed media-metadata database in response to a determination that no other version of the media file already exists in the distributed-media-library system;
obtain a second version of the media file of the given media type;
determine that the second version of the media file has not previously been processed by any device of the distributed-media-library system;
determine first and second metadata elements associated with the second version of the media file;
combine the first and second metadata elements associated with the second version of the media file according to the selected fingerprint instruction to generate a deterministic, system-wide, metadata-derived identifier not based on media content of the second version of the media file of the given media type but upon the first metadata element associated with the second version of the media file of the given media type and upon the second metadata element associated with the second version of the media file of the given media type;
embed in the second version of the media file the metadata-derived identifier based upon the first metadata element associated with the second version of the media file of the given media type and upon the second metadata element associated with the second version of the media file of the given media type;
list the media file of the given media type only once responsive to the metadata-derived identifier based upon the first metadata element associated with the first version of the media file of the given media type and upon the second metadata element associated with the first version of the media file of the given media type in the first version of the media file being identical to the metadata-derived identifier based upon the first metadata element associated with the second version of the media file of the given media type and upon the second metadata element associated with the second version of the media file of the given media type in the second version of the media file, rather than listing both the first and second versions of the given piece of media content, in a content list for presentation to a user.

7. The non-transitory computer-readable storage medium of claim 6, wherein the instructions that configure the processor comprise instructions configuring the processor to query the distributed media-metadata database to determine that the metadata-derived identifier has not been previously recorded in the distributed media-metadata database.

8. The non-transitory computer-readable storage medium of claim 6, wherein when the media file is of a video media type, the first set of two metadata elements consists of a file-name metadata element and a file-size metadata element.

9. The non-transitory computer-readable storage medium of claim 6, wherein when the media file is of an audio media type, the first set of two metadata elements consists of a file-name metadata element and a duration metadata element.

10. A non-transitory computer-readable storage medium having stored thereon instructions including instructions that, when executed by a processor, configure the processor to:
obtain a metadata-derived identifier from a distributed media-metadata database; the metadata-derived identifier identifying a media file of a given media type including at least one of audio or video content; at least first and second versions of the media file of the given media type both residing in the distributed-media-library system; the first version of the media file of the given media type having been processed by a determination that the first version of the media file has not previously been processed by any device of the distributed-media-library system and by a predetermined set of media-type-specific fingerprint instructions for generating identifiers based on metadata associated with media files of various media types having been obtained and by a fingerprint instruction from the set of media-type-specific fingerprint instructions having been selected from the predetermined set of media-type-specific fingerprint instructions based at least in part on the given media type and by the metadata-derived identifier having been generated according to the selected fingerprint instruction not based on media content of the media file of the given media type but upon a first metadata element associated with the first version of the media file of the given media type and upon a second metadata element associated with the first version of the media file of the given media type in the first version of the media file and by the metadata-derived identifier having been embedded in the first version of the media file; the second version of the media file of the given media type having been processed by a determination that the second version of the media file has not previously been processed by any device of the distributed-media-library system and by the fingerprint instruction from the set of media-type-specific fingerprint instructions having been selected based at least in part on the given media type and by the metadata-derived identifier having been generated according to the selected fingerprint instruction not based on media content of the media file of the given media type but upon a first metadata element associated with the second version of the media file of the given media type and upon a second metadata element associated with the second version of the media file of the given media type in the second version of the media file and by the metadata-derived identifier having been embedded in the second version of the media file; and list the media file of the given media type only once responsive to the metadata-derived identifier based upon the first metadata element associated with the first version of the media file of the given media type and upon the second metadata element associated with the first version of the media file of the given media type in the first version of the media file being identical to the metadata-derived identifier based upon the first metadata element associated with the second version of the media file of the given media type and upon the second metadata element associated with the second version of the media file of the given media type in the second version of the media file, rather than listing both the first and second versions of the given piece of media content, in a content list for presentation to a user.

11. The non-transitory computer-readable storage medium of claim 10, wherein the instructions that configure the processor comprise instructions configuring the processor to query the distributed media-metadata database to determine that the metadata-derived identifier has not been previously recorded in the distributed media-metadata database.

12. The non-transitory computer-readable storage medium of claim 10, wherein the predetermined set of media-type-specific fingerprint instructions for generating identifiers based on metadata associated with media files of various media types is configured so that when the media file is of a video media type, the first metadata element consists of a file-name metadata element and the second metadata element consists of a file-size metadata element.

13. The non-transitory computer-readable storage medium of claim 10, wherein the predetermined set of media-type-specific fingerprint instructions for generating identifiers based on metadata associated with media files of various media types is configured so that when the media file is of an audio media type, the first metadata element consists of a file-name metadata element and the second metadata element consists of a duration metadata element.

14. The non-transitory computer-readable storage medium of claim 10, wherein the predetermined set of media-type-specific fingerprint instructions for generating identifiers based on metadata associated with media files of various media types is configured so that when the media file is of a video media type, the first metadata element consists of a file-name metadata element and the second metadata element consists of a duration metadata element.

15. The non-transitory computer-readable storage medium of claim 10, wherein the fingerprint instruction selected from the predetermined set of media-type-specific fingerprint instructions for generating identifiers based on metadata associated with media files of various media types is configured partly based on a duration metadata element.

16. A media-library-device-implemented method for introducing media files into a distributed-media-library system, the method comprising:

obtaining, by a media-library device, a metadata-derived identifier from a distributed media-metadata database; the metadata-derived identifier identifying a media file of a given media type including at least one of audio or video content; at least first and second versions of the media file of the given media type both residing in the distributed-media-library system; the first version of the media file of the given media type having been processed by a determination that the first version of the media file has not previously been processed by any device of the distributed-media-library system and by a predetermined set of media-type-specific fingerprint instructions for generating identifiers based on metadata associated with media files of various media types having been obtained and by a fingerprint instruction from the set of media-type-specific fingerprint instructions having been selected from the predetermined set of media-type-specific fingerprint instructions based at least in part on the given media type and by the metadata-derived identifier having been generated according to the selected fingerprint instruction not based on media content of the media file of the given media type but upon a first metadata element associated with the first version of the media file of the given media type and upon a second metadata element associated with the first version of the media file of the given media type in the first version of the media file and by the metadata-derived identifier having been embedded in the first version of the media file; the second version of the media file of the given media type having been processed by a determination that the second version of the media file has not previously been processed by any device of the distributed-media-library system and by the fingerprint instruction from the set of media-type-specific fingerprint instructions having been selected based at least in part on the given media type and by the metadata-derived identifier having been generated according to the selected fingerprint instruction not based on media content of the media file of the given media type but upon a first metadata element associated with the second version of the media file of the given media type and upon a second metadata element associated with the second version of the media file of the given media type in the second version of the media file and by the metadata-derived identifier having been embedded in the second version of the media file; and listing, by the media-library device, the media file of the given media type only once responsive to the metadata-derived identifier based upon the first metadata element associated with the first version of the media file of the given media type and upon the second metadata element associated with the first version of the media file of the given media type in the first version of the media file being identical to the metadata-derived identifier based upon the first metadata element associated with the second version of the media file of the given media type and upon the second metadata element associated with the second version of the media file of the given media type in the second version of the media file, rather than listing both the first and second versions of the given piece of media content, in a content list for presentation to a user.

17. The method of claim 16, further comprising determining that no version of the media file already exists in the distributed-media-library system as a component of processing the first version of the media file of the given media type, the media-library device having processed the first version of the media file of the given media type as a component of importing the first version of the media file into the distributed-media-library system.

18. The method of claim 17, wherein determining that no version of the media file already exists in the distributed-media-library system comprises querying the distributed media-metadata database to determine that the metadata-derived identifier has not been previously recorded in the distributed media-metadata database.

19. The method of claim 16, wherein the predetermined set of media-type-specific fingerprint instructions for generating identifiers based on metadata associated with media files of various media types is configured so that when the media file is of a video media type, the first metadata element consists of a file-name metadata element and the second metadata element consists of a file-size metadata element.

20. The method of claim 16, wherein the predetermined set of media-type-specific fingerprint instructions for generating identifiers based on metadata associated with media files of various media types is configured so that when the media file is of an audio media type, the first metadata element consists of a file-name metadata element and the second metadata element consists of a duration metadata element.

21. The method of claim 16, wherein the predetermined set of media-type-specific fingerprint instructions for generating identifiers based on metadata associated with media files of various media types is configured so that when the media file is of a video media type, the first metadata element consists of a file-name metadata element and the second metadata element consists of a duration metadata element.

\* \* \* \* \*